Figure 1:
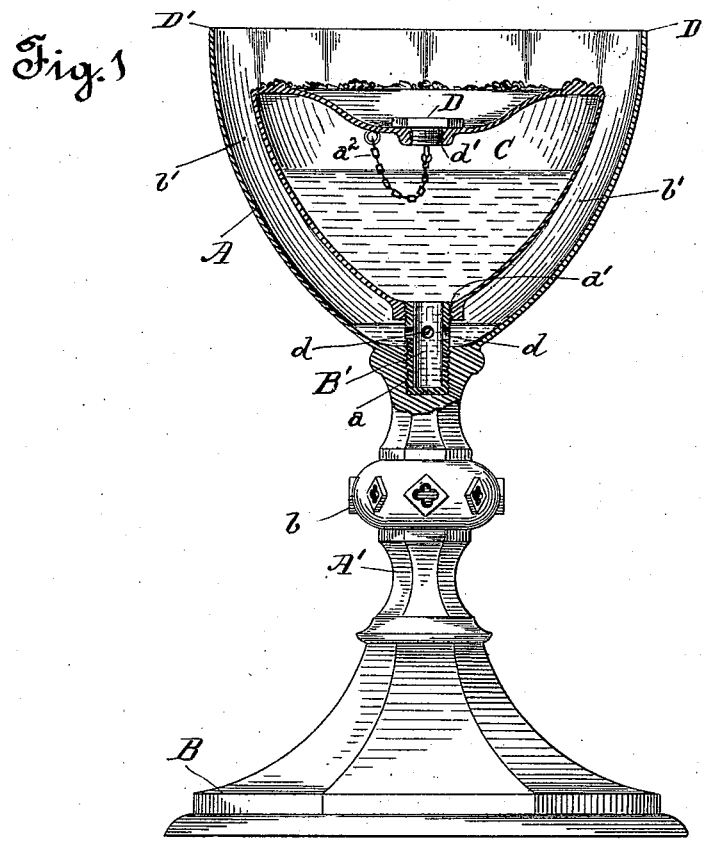

(No Model.)

V. M. LAW.
CHALICE.

No. 574,615. Patented Jan. 5, 1897.

Witnesses.

Inventor.
Victor M. Law
by N. A. Acker
Atty.

UNITED STATES PATENT OFFICE.

VICTOR M. LAW, OF EAST OAKLAND, CALIFORNIA.

CHALICE.

SPECIFICATION forming part of Letters Patent No. 574,615, dated January 5, 1897.

Application filed August 23, 1895. Serial No. 560,202. (No model.)

*To all whom it may concern:*

Be it known that I, VICTOR M. LAW, a citizen of the United States, residing at East Oakland, in the county of Alameda and State of California, have invented certain new and useful Improvements in Chalices; and I do hereby declare that the following is a full, clear, and exact description thereof.

This invention relates to a certain new and useful chalice or communion-cup which consists in the arrangement of parts and details of construction, as will be hereinafter fully set forth in the drawings, and described and pointed out in the specification.

The invention consists in providing a chalice with an inner reservoir so arranged as automatically to vent as the chalice is tipped over to permit the communicant to consume the wine contained therein and to automatically permit the outflow of sufficient wine into the chalice to suffice for the next communicant as the chalice is placed in a vertical position, the object of the invention being to overcome the objection that the communicants have to the use of the chalice wherein the body of the cup or chalice is filled with the wine and out of which each communicant takes a sip and leaves the remainder for the next communicant, and so on until the chalice is empty.

In order fully to comprehend my invention, reference must be had to the accompanying sheet of drawings, forming a part of this application, wherein—

Figure 2:
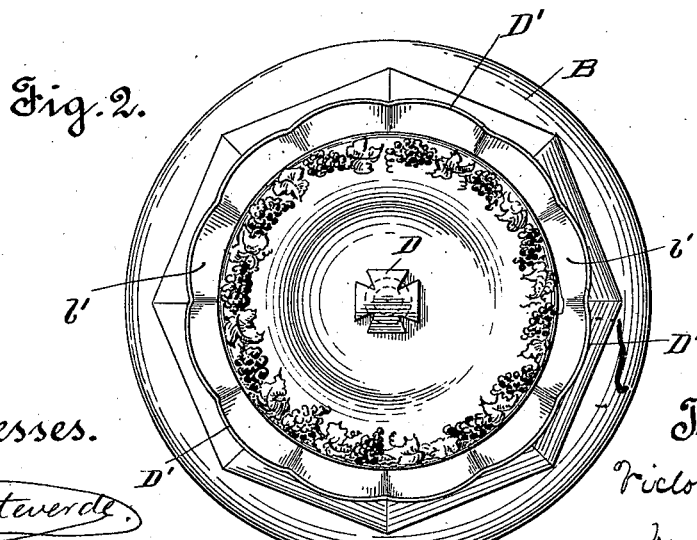

Figure 1 is a view in elevation showing the chalice and inner reservoir in section, and Fig. 2 is a top plan view of the chalice.

In the drawings, the letter A is used to indicate the chalice, and A' the stem thereof, which stem is united with the base or foot B. The stem A' is provided with the ornamental knob $b$ in order to permit of a firm hold being secured upon the vessel. These features are of the ordinary construction and form no part of my present invention.

Within the upper end of the stem A' is cut the screw-threaded seat or socket $a$, within which seat or socket is screwed the lower end of the screw-threaded vent-tube B'. To the upper end of the screw-threaded vent-tube is secured the reservoir C, the said end of the vent-tube fitting within the screw-threaded opening $a'$, cut through the lower end or bottom of the reservoir C. This reservoir fits within or inside the chalice or cup A and conforms to the shape thereof, although less in diameter than the interior diameter of the chalice or cup. Consequently there is left an annular passage-way $b'$ between the inner wall of the chalice and the outer wall of the reservoir C, Fig. 1.

The tube B' is provided with two or more openings $d$ below the bottom of the reservoir, which openings serve as vent-openings for the reservoir and escape-openings for the wine to flow from the reservoir C.

Within the top of the reservoir I cut the screw-threaded opening $d'$, which is closed by the stopper or plug D, connected to the interior of the reservoir by means of the chain $a^2$, the head of which plug or stopper is suitably ornamented by a Maltese cross, Fig. 2. The top edge of the reservoir is provided in relief with grapes and grape-vine leaves, which not only serve as ornamentation for the reservoir, but give a roughened surface thereto, by which it may be held while being screwed upon or unscrewed from the upper end of the vent-tube.

In order to fill or clean the reservoir C, the same is unscrewed from the vent-tube B', and the wine, if the reservoir is to be filled, and the water, if the reservoir is to be cleansed, are introduced into the reservoir through the opening $a'$, cut in the bottom thereof.

The chalice herein shown is designed to eject from the reservoir for each communicant about one teaspoonful of wine, and the operation of the device is as follows: Before the minister passes the chalice to the first communicant he tips the chalice over in order that air may be admitted into the reservoir through one or more of the openings $d$, cut through the vent-tube B'. As the chalice is raised into a vertical position a quantity of wine will flow from the reservoir through the openings $d$ into the bottom of the chalice equal to the displacement occasioned by the amount of air admitted into the reservoir. The chalice is then handed to the first communicant, and as tipped or turned over by the said communicant to consume the wine therein which flows within the passage-way $b'$ the reservoir again vents, and when handed back to the minister or raised to a vertical position a second quantity of wine flows from the reservoir into the chalice. Each time the chalice is tipped over the reservoir is vented, and each time it is raised into a vertical position a given quantity of wine is discharged from the reservoir into the chalice. The quantity of wine permitted to flow from the reservoir depends entirely upon the size of the openings formed within the vent-tube. The larger the openings cut within the vent-tube the greater the admission of air into the reservoir. Consequently the displacement within the reservoir will be greater and a larger quantity of wine will be forced from the reservoir into the chalice.

When the wine within the reservoir remains undisturbed, it will not flow into the chalice, for the atmospheric pressure will more than overcome the pressure of the wine within the reservoir and will thus check the outflow and prevent the escape of the wine from the reservoir.

It will thus be observed that the venting of the reservoir and the escape of the wine therefrom into the chalice is entirely automatic, and that only such a quantity of wine is permitted to escape from the reservoir as will answer for one communicant.

The edge D' of the chalice is scalloped, so as to provide a series of independent mouth-places, Fig. 2. After one communicant has partaken of the wine the minister should turn the chalice so as to bring the next mouth-place into position before presenting the chalice to the second communicant, and so continue to turn the cup or chalice until the first series of communicants have sipped of the wine. The edge of the chalice should then be carefully wiped before being presented to the second series of communicants in order that the chalice may be perfectly clean.

Inasmuch as the minister is required to consume such wine as is left after serving the communicants, it is desirable that the wine be permitted to flow freely from the reservoir in order to avoid unnecessary delay. This is accomplished by simply removing the stopper or plug D, when the wine will escape from the reservoir through the opening $d'$, cut through the top thereof.

Having thus described my invention, what I claim as new, and desire to secure protection in by Letters Patent, is—

1. A chalice consisting of a cup-section, and a reservoir-section located in the cup-section having a discharge and vent opening at or near its base, a fill-opening in its top, and a sealing-closure for the fill-opening, substantially as described.

2. A chalice consisting of a cup-section and a reservoir-section located within the cup and held free from the sides thereof, and having a vent and discharge opening at or near its base, and a closed top, substantially as described.

In testimony whereof I affix my signature, in presence of two witnesses, this 16th day of August, 1895.

VICTOR M. LAW.

Witnesses:
N. A. ACKER,
W. H. COBB.